A. F. SHORE.
SCLEROSCOPE.
APPLICATION FILED NOV. 26, 1907.
962,790.
Patented June 28, 1910.
2 SHEETS—SHEET 2.
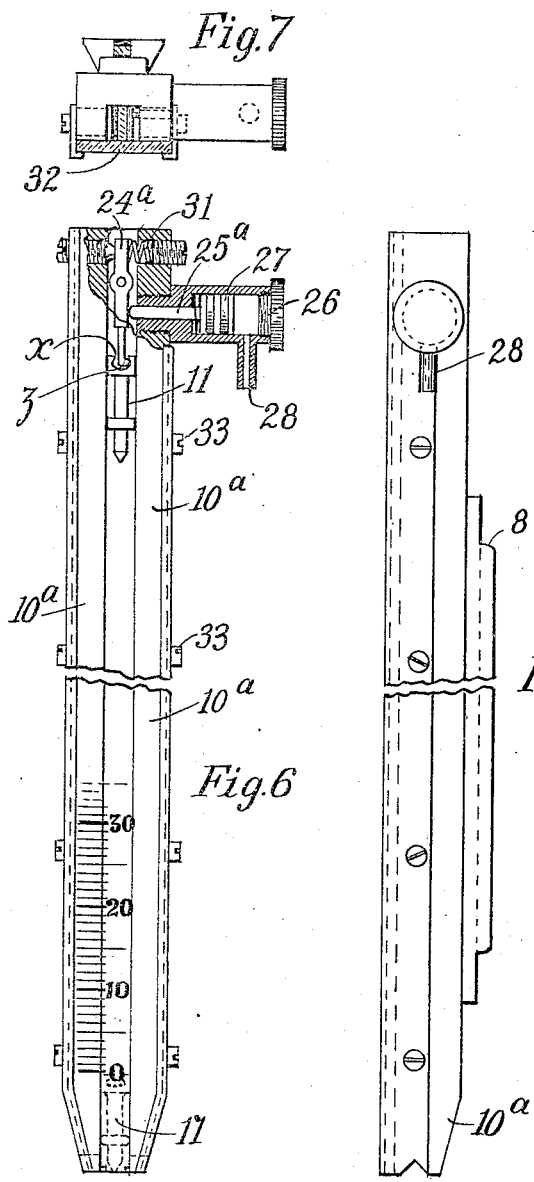

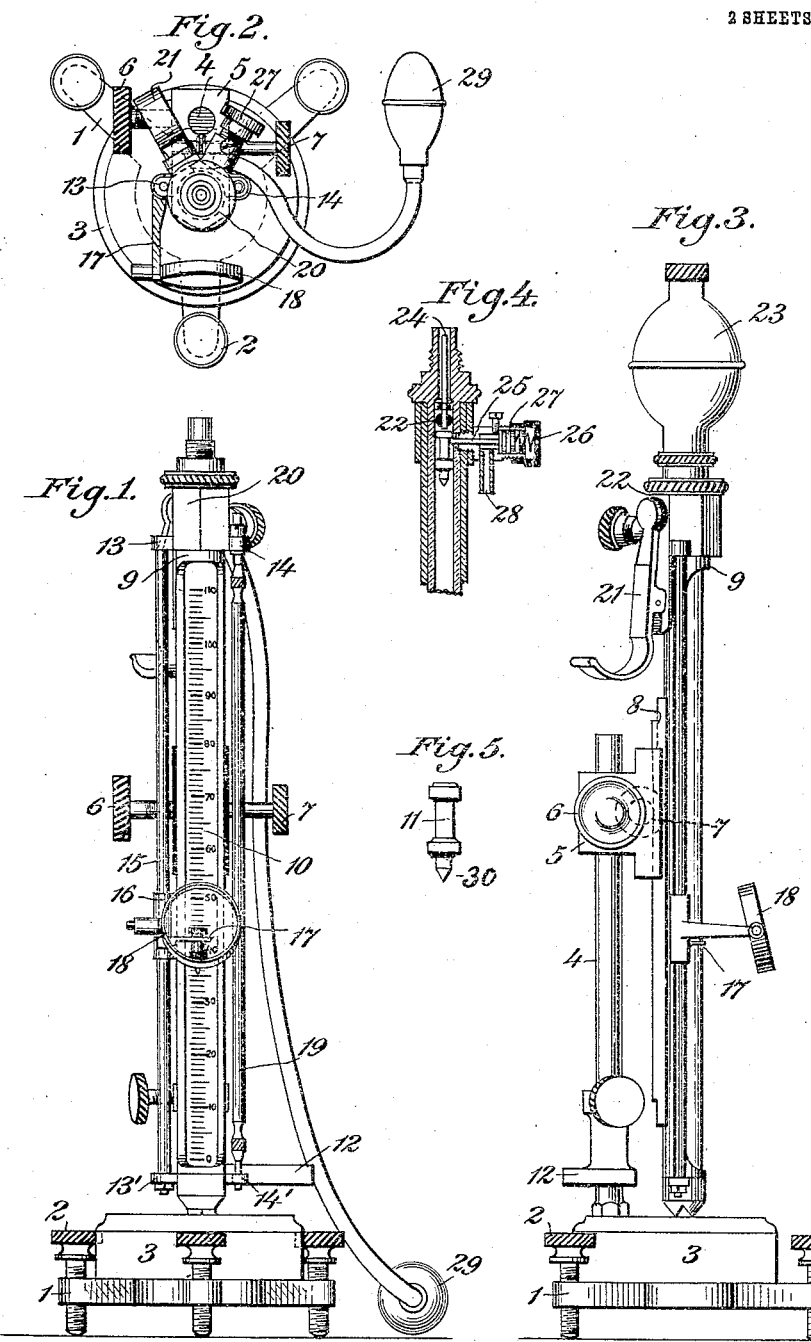

UNITED STATES PATENT OFFICE.

ALBERT F. SHORE, OF NEW YORK, N. Y., ASSIGNOR TO SHORE INSTRUMENT MANUFACTURING COMPANY, OF NEW YORK, N. Y., A CORPORATION OF NEW YORK.

SCLEROSCOPE.

962,790. Specification of Letters Patent. Patented June 28, 1910.

Application filed November 26, 1907. Serial No. 403,981.

*To all whom it may concern:*

Be it known that I, ALBERT F. SHORE, a citizen of the United States, and a resident of New York, in the county of New York and State of New York, have invented certain new and useful Improvements in Scleroscopes, of which the following is a specification.

The object of my invention is to furnish a hardness testing apparatus, which shall be direct reading, and which while sufficiently simple to be employed by the non-scientific workman, shall at the same time meet all the requirements of the scientific laboratory.

A further object of my invention is to eliminate from the tests for hardness the false readings due to the accompanying tensile strength, and to allow the true hardness to be read directly from an indicating scale.

My invention is the outcome of a long and widely extending series of experiments to determine the true cause for the difference in hardness as observed between different bodies or between different parts of the same body. I believe I have discovered that there is a direct connection between true hardness and elasticity and that there is a fixed ratio between the hardness and elasticity of bodies. In the following description I assume my premise to be true, and I base my reasoning upon this premise and upon the unanimous agreement among the large number of experiments that confirm my opinion. However, should the reason for the effects prove to be erroneous, that will not in any way affect the operation of my apparatus or the results accruing from its use. It will accurately indicate the hardness and relative characteristics of metals in such a manner that the scientific or non-scientific worker can test his work at every stage, can determine why a metal works well or poorly, and can reproduce at will a metal having such a degree of hardness as he desires.

The actually essential features of a device for carrying out my invention are a properly fashioned striker falling under gravity, guides controlling the direction of fall of the striker and means for observing and determining the amount of its rebound. Rough tests can be made with such a crude form of my invention, but for commercial and scientific results the essential features are a tube, preferably transparent, a piston-like striker free to move in said tube, means for raising the striker to and retaining it at a definite point, means for releasing the striker and for observing, preferably on a scale, the extent of its rebound.

In the accompanying drawings, which show a preferred form of my invention with all its accessories:—Figure 1 is a front elevation showing the graduated scale and most of the prominent features of the instrument; Fig. 2, a top view; Fig. 3 shows a side elevation, having the suction-bulb that is wanting in Fig. 1; Fig. 4 is a vertical section taken through the top of the instrument, showing the means for checking, holding and releasing the striker; Fig. 5 is a full sized view of the striker and its point; Fig. 6 is a front elevation, partly in section, of the simpler form of my apparatus, in which are shown guides controlling the course of the striker; Fig. 7 is a top view of Fig. 6, and Fig. 8, a side view of the same.

Referring to the drawings: 1 is a tripod adjusted by the screws 2, having fastened to it the hardened steel base-plate 3, and the upright post 4, which carries an adjustable sliding pinion-block 5, held in position by the screw 6. The post has also attached to it the adjustable squaring foot-plate 12.

7 is pinion-knob actuating the tongue-bar 8, and thereby the metallic casing 9, inclosing the glass tube 10, in which moves the striker 11. In the simplest form of the apparatus this graduated tube is replaced by guides $10^a$, between which the striker moves, though for convenience of raising, retaining, dropping and observing the movements of the striker, the glass tube is the preferred form.

Fashioned to the top and bottom of casing 9 are two lugs 13—$13^1$ and 14—$14^1$. 13—$13^1$ support the rod 15 carrying the adjustable sleeve 16, to which are fastened the set-finger 17 and the lens 18. The lug 14 is attached to the plumb-bob 19, whose lower end swings in the lug $14^1$, the position of the bob in the gage-hole indicating the general level of the mechanism. In the base of the glass tube casing 9 is a V-shaped orifice to allow escape of air from the glass tube on the dropping of the striker and to center up round objects under test.

20 is a hexagonal sleeve fastened to casing 9, and carrying the spring controlled air valve 21 governing the inlet-hole 22, which penetrating the hexagonal sleeve 20 and the 11● metallic casing 9, supplies air to the upper portion of the glass tube 10.

23 is a suction bulb for drawing the striker to the top of the glass tube where it is checked by the shock-absorber 24.

The striker 11 is provided with a shoulder which engages when at the highest position in the tube 10 with the piston and catch-pin 25, whose action is controlled by the spring 26 inclosed within and adjusted by the cap 27.

28 is an air-nipple communicating with the pressure bulb 29.

The striker 11 terminates at its lower end in a microscopically blunt or round point 30, and weighs in my preferred form of apparatus about 1-12th of an ounce.

In the simpler form of apparatus shown in Figs. 7 and 8, guides 10ª, replacing the tube 10, direct the course of the striker 11, and the device 24ª serves the double purpose of shock-absorber and catch-pin for the striker 11. To fit the striker for use in this connection, its top is provided with a circular hole $x$, with the rim of which engages the hook-shaped end $z$, of the shock-absorber 24ª. The engagement of the shock-absorber with the striker is controlled by the spring 31, and a pneumatically operated plunger-pin 25ª effects the striker's release. 32 is a graduated glass strip retained in position by screws 33, and the striker's rebound is read from the glass scale. Pressing on the bulb 29 forces forward the plunger-pin 25ª, releasing the hook-end $z$, and allowing the striker to descend.

The operation of my apparatus is as follows:—The instrument having been leveled up by means of the adjusting screws 2, the position of the plumb-bob 19 in the center of lug 14¹ shows that the apparatus is ready for work. Repeated trials of various kinds of leveling devices have compelled the adoption of a long swinging plumb-bob, suspended as high as possible, as the only way of securing the delicate adjustment requisite for the most accurate work. The metallic casing 9 having been raised by means of the screw 7, and the metal to be tested being placed on the steel base-plate 3, the casing is lowered until the V-shaped end rests upon the steel under test. Pressure on and release of the bulb 23 draws the striker 11 to the top of the graduated tube 10 where its shoulder is engaged and held by the catch pin 25. To allow the striker to fall freely, the lever 21 is pressed, opening the inlet-valve 22, thereby equalizing the air pressure in the upper and lower portions of the tube 10. This is necessary, because otherwise the partial vacuum created behind the falling striker would entirely vitiate the results. Pressing now on the air-bulb 29 operates the piston-catch 25, releasing the striker, which descending, rebounds to a certain height dependent upon and measuring the hardness of the steel under test. If we are using the simplest form of the device, in which the glass tube is replaced by guides controlling the path of motion of the striker, the suction-bulb 23 will necessarily not be employed, and the pneumatic release bulb 29 may be dispensed with. However, as it is important that the instrument should be as nearly vertical as possible to work at its best, and as shocks interfere with correct readings, the perfected device shown in the drawings will be preferred for any but the roughest tests, and the suction-bulb, the pneumatic release, the graduated glass tube and the leveling attachment are desirable features for accurate observation.

Any standard of hardness can be adopted for the scale and any scale divisions marked off thereon, provided, of course, the scale divisions are coördinated with the hardness of the striker and its rebound. For instance, hardened steel or glass may be chosen as the limit, the scale divided according to the relation as to hardness of other metals to the standard, the results read directly from the scale. I have worked out a special scale for the instrument, as shown in the drawings, in which hardened tool steel is taken as 100 and glass as 110. The length of the tube 10 being about 10 inches, the 110 divisions show the empiric character of the scale. In the operation of my device, there are three constants, the height from which the striker falls, the hardness of the striker and the scale deduced from experiment and observation.

To assist in reading the scale, the lens 18 and the set-finger 17 are employed. After a few trials one has a general idea of about how high the striker will rebound from a given metal, and the lens and finger are set accordingly. In order to make sure that the point of the striker 11 will not become deformed under repeated blows, it is after being formed, subjected to extreme pressure for the purpose of compressing it as much as possible, after which the point will not yield under repeated operation. This is an essential feature in my apparatus, for should the striker point give way, the results would be uncertain after a very short time. I overcome this defect in a remarkable degree by compressing the steel striker to as near the limit of compressibility of steel as I can reach, and a pressure of 100,000 lbs. to square inch and more, applied when the steel striker is hot, gives it a fracture resembling glass. In this condition, the striker can be used and give accurate readings for over a thousand tests, and can then be thrown away, as the expense of replacement is very small. When the specimens to be tested have irregular shapes, they are embedded in asphaltum or other plastic material and the exposed surface set square by lowering on it the foot-plate 12, which is adapted to press upon and level up the object. When masses too large to rest upon the base-plate 3 are to be tested, the whole portion of the apparatus supported by the rod 4 is swung around until the glass tube casing can be lowered without resting on the base-plate 3. The glass tube is then lowered to the surface upon which the tripod rests and the tests are repeated as before.

I have said the point of the striker should be slightly rounded, and the best results are thus attained. If the point is sharp, the fibers of the metal treated appear to be cut, the rebound of the striker to be irregularly affected, and the results are unsatisfactory. The rebound of the striker seems to measure the molecular resistance to penetration, or the force with which the molecules throw back an indenting body. The surface of the tested metal seems to give way without breaking when a rounded point is used, showing that the molecules in that immediate vicinity do not separate beyond the limit of recovering their original arrangement. As my instrument measures the resistance to molecular displacement, and as this resistance determines the hardness, the *rationale* of my instrument's operation is clear. It is an interesting fact that my striker when it falls effects a permanent change in the spot on the metal where it strikes. Falling a second time on the same spot, it rebounds higher than at first, and a new spot must be presented to the striker at each rebound. With a lens the depression made in the hardest metals can be clearly distinguished. The molecular elasticity at the point of contact seems to be impaired to a certain extent.

Claims.

1. An apparatus for testing the hardness of solid bodies, which consists of a finely pointed superhard striker impinging said bodies, vertical guiding means for directing the course of the striker, and means for observing and registering the rebound of the same.

2. In a hardness testing device, the combination of a specially graduated tube, a very light, highly-compressed striker moving freely in said tube, means for raising the striker in the tube, and means for catching and retaining the striker at the desired point.

3. In a hardness testing device, the combination of a graduated tube provided with a shock absorber and an adjustable catch-pin, a striker moving freely in said tube, and adapted to be stopped and held by the said shock absorber and catch-pin, substantially as set forth.

4. In a hardness testing device, the combination of a graduated tube, a striker moving in said tube, and a suction-bulb for raising the striker, substantially as set forth.

5. In a hardness testing device, the combination of a graduated tube, a striker moving in said tube, a suction device for raising the striker in the tube, and an automatic striker-catch and retaining-pin.

6. In a harness testing device, the combination of a glass tube, a striker moving freely in said tube, an automatic striker-catch and releasing-pin, and a pneumatically operated striker-release, substantially as set forth.

7. As a new article of manufacture, a hardness testing device composed of a highly compressed and hardened light striker having a slightly rounded point, said striker being adapted to rebound, guiding means for the striker, and a scale graduated to indicate directly by the rebound of the striker the hardness of the substance under test.

Signed at New York in the county of New York and State of New York this 30th day of July A. D. 1907.

ALBERT F. SHORE.

Witnesses:
A. STETSON,
J. HART ROBERTSON.